(No Model.) 2 Sheets—Sheet 1.

F. LUDLOFF.
TOOL FOR CUTTING SHEET METAL, &c.

No. 402,949. Patented May 7, 1889.

Witnesses
William Miller
Edward Wolff

Inventor
Friedrich Ludloff
by Van Santvoord & Hauff
his attys.

(No Model.) 2 Sheets—Sheet 2.

F. LUDLOFF.
TOOL FOR CUTTING SHEET METAL, &c.

No. 402,949. Patented May 7, 1889.

Witnesses
William M. Miller
Edward Wolff.

Inventor
Friedrich Ludloff.
by Van Santvoord & Hauff
his attys

UNITED STATES PATENT OFFICE.

FRIEDRICH LUDLOFF, OF MARTINIKENFELDE, NEAR BERLIN, GERMANY.

TOOL FOR CUTTING SHEET METAL, &c.

SPECIFICATION forming part of Letters Patent No. 402,949, dated May 7, 1889.

Application filed February 14, 1889. Serial No. 299,887. (No model.)

*To all whom it may concern:*

Be it known that I, FRIEDRICH LUDLOFF, a subject of the Prince of Schwarzburg-Sondershausen, residing at Martinikenfelde, near Berlin, in the Kingdom of Prussia, Germany, have invented new and useful Improvements in Tools for Cutting Sheet Metal, Pasteboard, and the like, of which the following is a specification.

This invention relates to a tool for cutting sheet metal, pasteboard, and other material; and the object of the invention is to secure a simple and light device which can be easily operated, as set forth in the following specification and claims and illustrated in the accompanying drawings, in which—

Figure 1:
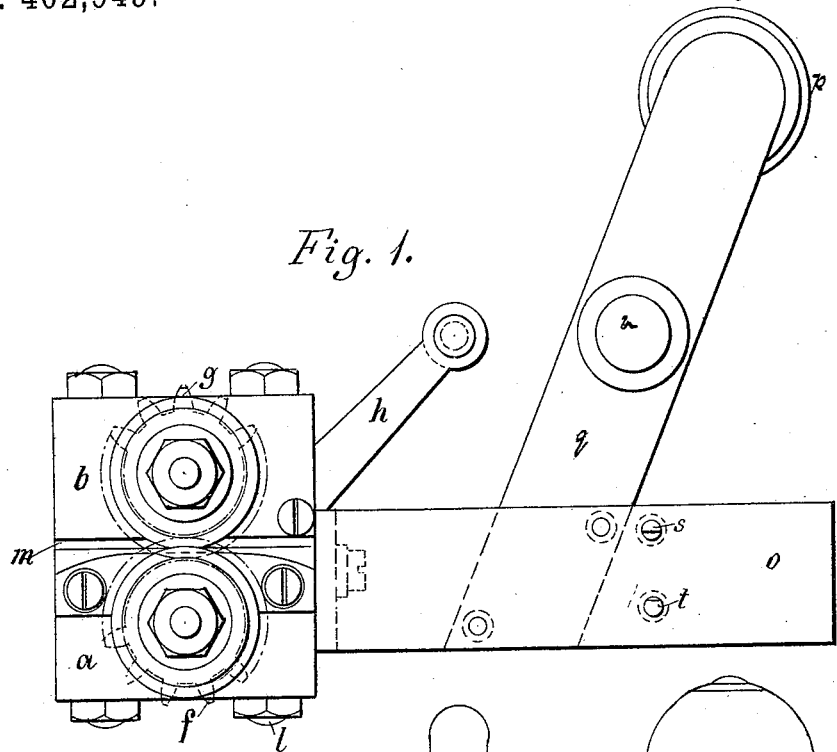
Figure 2:
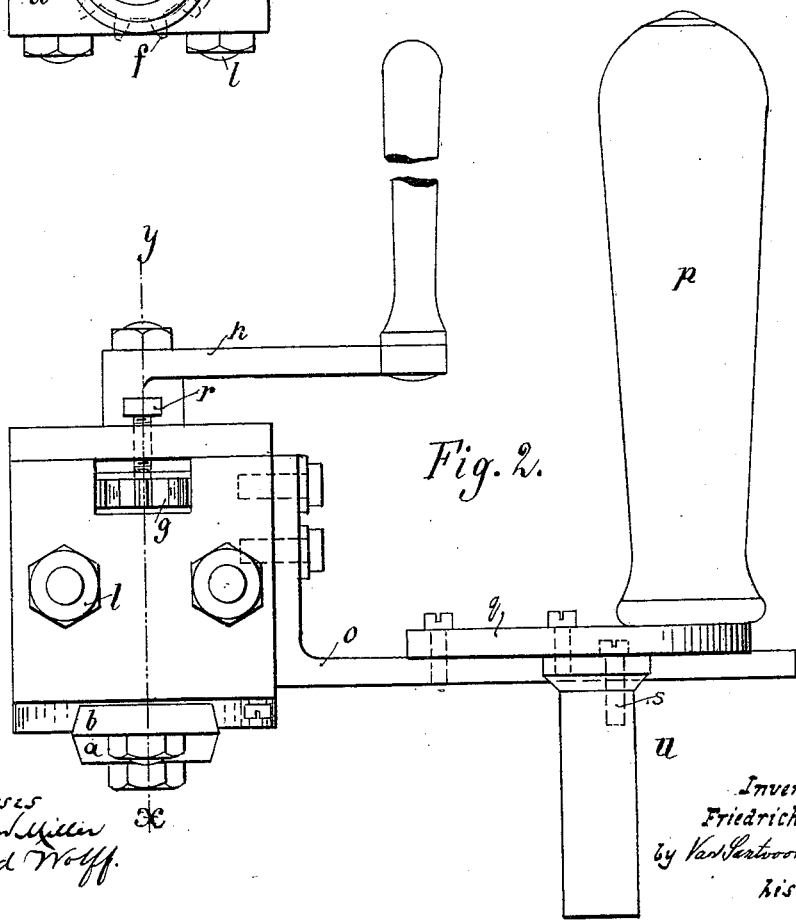
Figure 3:
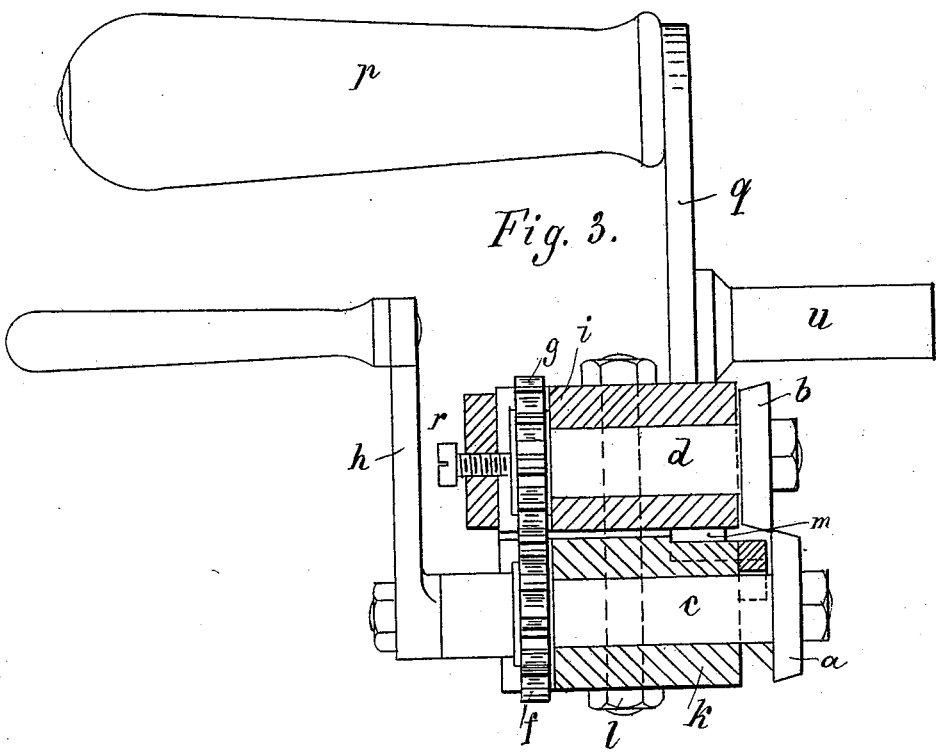
Figure 4:
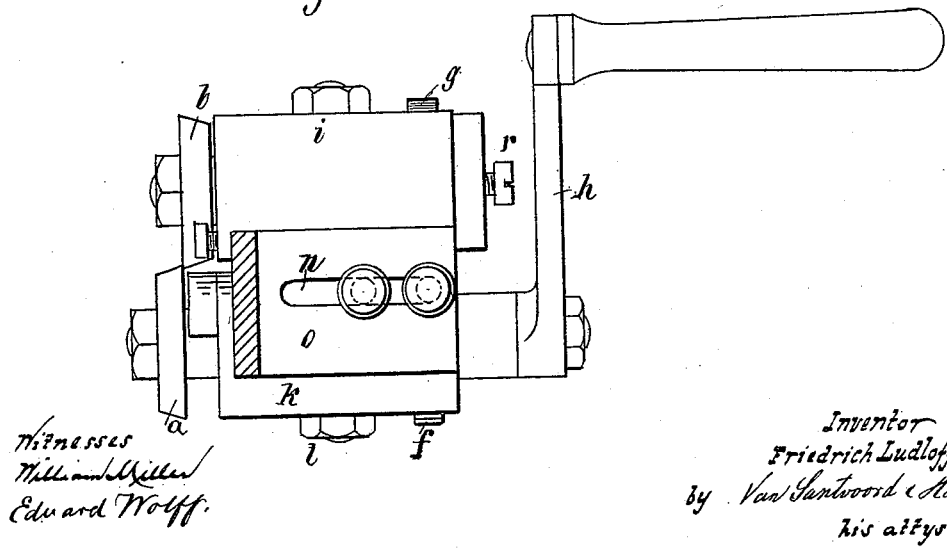

Figure 1 is a side view of a cutting-tool. Fig. 2 is a plan view of Fig. 1. Fig. 3 is a section along line $x\,y$, Fig. 2. Fig. 4 is a front view of Fig. 1, partly in section.

Similar letters indicate corresponding parts.

The cutting-disks $a\,b$ have their cutting-edges co-operating with one another, and said disks are secured to the shafts $c\,d$. The gear-wheels $f\,g$ cause the disks to rotate together, and the handle $h$ enables motion to be imparted to the disks. The bearings $i\,k$ of the shafts are connected by bolts $l$, and one of said bearings—as, for example, $i$—is movable or adjustable with respect to the other bearing, said bearing $i$ having slots through which the bolts $l$ pass. By loosening the bolts $l$ and suitably operating the set-screw $r$ the cutter $b$ can be adjusted relatively to the cutter $a$. The slot or space $m$ between the bearings $i\,k$ serves for introducing and guiding the material to be cut.

The gage $o$ serves to regulate the width of the strip to be cut. The gage is adjustable, being provided with the slot $n$, Fig. 4, through which pass the screws which hold the gage in place. To the gage is secured the piece $q$, having a handle, $p$, for guiding the device. The studs $s\,t$, Fig. 1, project, respectively, over and under the material to be cut, and prevent the device being too much inclined relatively to the material to be cut. The lug $u$ serves for attaching a source of power, such as a strap connected to the foot of the operator or pulled by a second operator. This force can aid the force applied to handle $p$ for moving the device along.

The device operates as follows: The sheet of material—such as metal or pasteboard—from which strips are to be cut is clamped or fixedly secured to a table or support, and the gage $o$ is adjusted according to the width of the strip to be cut off. The tool is then applied to the sheet, so that the edge of the sheet bears against the gage $o$. By turning the crank $h$ and moving the device along the sheet such sheet will pass between the cutting-disks and the desired strip will be cut off.

Strips of equal width can be neatly and rapidly cut off by means of this device.

What I claim as new, and desire to secure by Letters Patent, is—

1. The cutting-disks mounted in bearings, one of which is adjustable with respect to the other, in combination with an adjustable guide, $o$, and handle $p$, substantially as described.

2. The cutting-disks mounted in bearings, one of which is adjustable with respect to the other, in combination with an adjustable guide, $o$, handle $p$, and lug $u$, substantially as described.

3. The cutting-disks mounted in bearings, one of which is adjustable with respect to the other, in combination with an adjustable guide, $o$, handle $p$, and studs $s\,t$, substantially as described.

In testimony whereof I have signed my name to this specification in the presence of two subscribing witnesses.

FRIEDRICH LUDLOFF.

Witnesses:
K. HAMILL,
G. HÜLSMANN.